Feb. 26, 1929.  1,703,275
H. F. LESSMANN
SCOOP LATCHING AND CONTROLLING MECHANISM
Filed Nov. 21, 1927
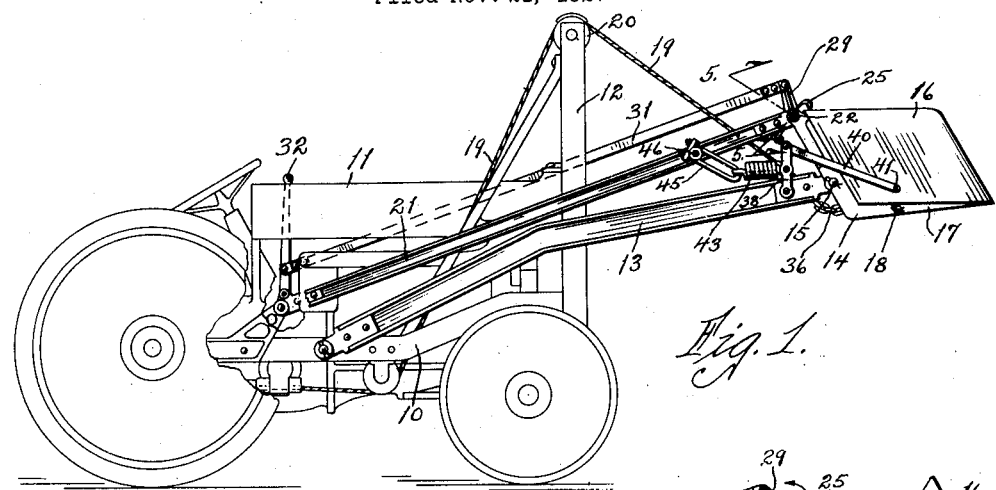
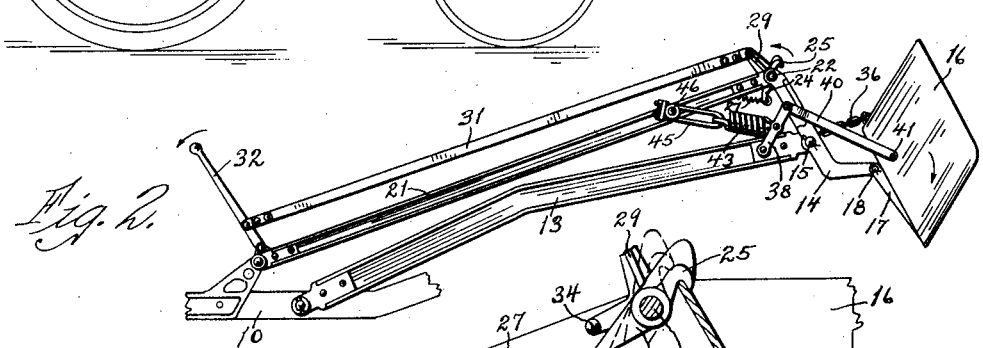
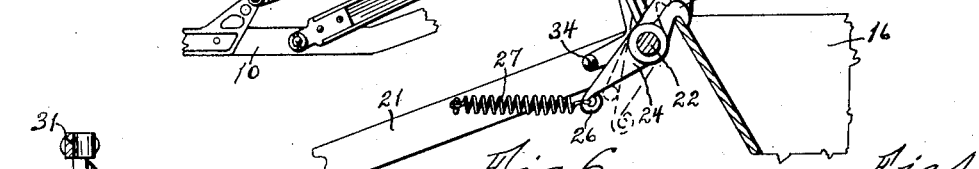
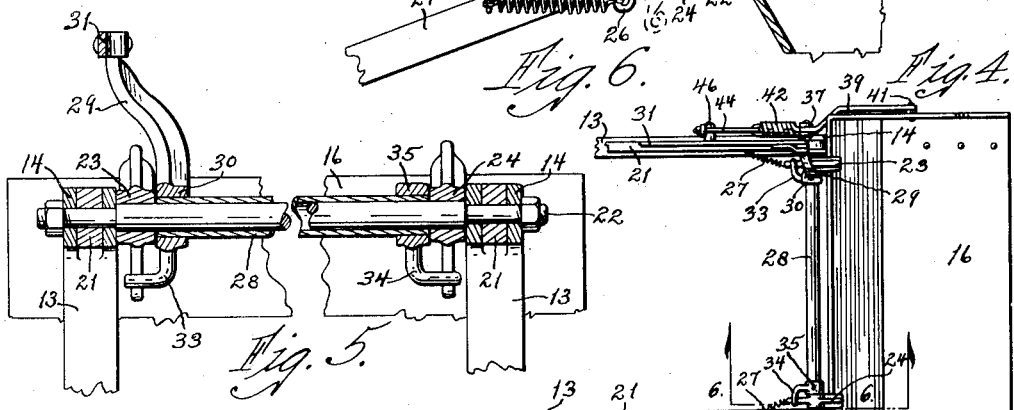
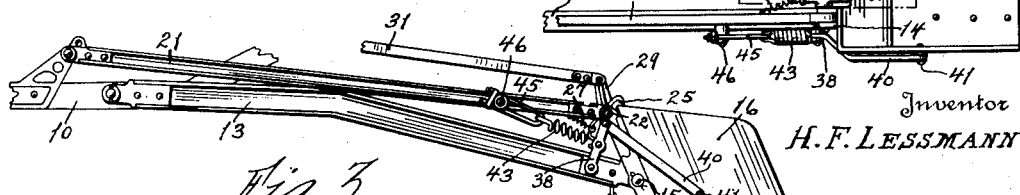
Inventor
H. F. LESSMANN
By Earl M. Sinclair
Attorney Patented Feb. 26, 1929.

1,703,275

UNITED STATES PATENT OFFICE.

HERBERT F. LESSMANN, OF DES MOINES, IOWA.

SCOOP LATCHING AND CONTROLLING MECHANISM.

Application filed November 21, 1927. Serial No. 234,750.

An object of this invention is to provide improved latching means for the scoop of a loading attachment or loader.

A further object of this invention is to provide improved means for releasing the latching means and permitting the scoop to move to dumping position.

Another object of the invention is to provide improved means for automatically returning the scoop to loading position after the dumping operation.

With these and other objects in view, my invention consists in the construction, arrangement and combination of elements hereinafter set forth, pointed out in the claims and indicated by the accompanying drawing in which—

Fig. 1 is a side elevation illustrating a loading attachment mounted on a tractor and equipped with my improved scoop latching and controlling mechanism.

Fig. 2 is a side elevation of a portion of a loading attachment and illustrating the scoop in position for dumping.

Fig. 3 is a side elevation of a portion of a loading attachment and showing the scoop in position for loading.

Fig. 4 is a plan view of the scoop and the scoop latching and controlling means.

Fig. 5 is a vertical section showing a portion of the scoop controlling means and taken on the line 5—5 of Fig. 1.

Fig. 6 is a cross-section illustrating particularly one of the scoop latches and taken on the line 6—6 of Fig. 4.

The mechanism embodied in the present improvement is particularly designed for use with a loading attachment of the type adapted to be mounted on a tractor. This attachment includes in a general way, a main frame 10 mounted on the tractor 11 and having an upright frame 12 secured to the main frame at the forward end of the tractor. A pair of lifting arms 13 are pivoted at their rear ends to the main frame 10 and substantially L-shaped scoop rests 14 are pivoted to the forward ends of the lifting arms by bolts or the like 15. The pivot bolts 15 are spaced somewhat above the angles of the L-shaped scoop rests 14. A scoop 16 is mounted on and carried by the scoop rests 14 and has tapering pivot members 17 fixed to its bottom wall and pivoted to the forward ends of the scoop rests 14 by bolts 18 or the like which are located rearwardly of the center of gravity of the scoop. The lifting arms 13 are arranged to be swung through arcs in vertical planes by means of cables 19 attached to their forward ends extending over pulleys 20 at the upper end of the frame 12 and thence extending rearwardly and downwardly where suitable connections are provided for applying draft to said cables from the power take-off of the tractor. A pair of stabilizing arms 21 are pivoted at their rear ends above the rear pivots of the lifting arms 13 and on opposite sides of the tractor 11 and said stabilizing arms extend forwardly and have pivotal connections to the upper ends of the respective scoop rests 14, preferably by means of a rod 22 which extends transversely from one scoop rest to the other and to which the stabilizing arms are pivotally connected adjacent the respective scoop rests. It is the function of the stabilizing arms to hold the scoop rests from tilting forwardly on their pivots 15 while the lifting arms 13 are being raised and lowered and particularly while they are being raised, in order to hold the scoop 16 in substantially horizontal position and prevent loss of its contacts or dumping of its load. The stabilizing arms 21 preferably are substantially straight from end to end and their forward ends are located immediately behind the upper portion of the rear wall of the scoop while the scoop is in loading position as shown in Fig. 3 or in carrying position as shown in Fig. 1; but the lifting arms 13 preferably are bent at an obtuse angle approximately midway of their length so that their rear ends are in substantially horizontal position and their forward end portions extend downwardly to a point behind the scoop when the scoop is in loading position as shown in Fig. 3.

A pair of latching members 23 and 24 are pivoted between their ends on the rod 22 adjacent the inner faces of the scoop rests 14 and said latching members are formed at their upper ends with hooks 25 adapted to engage the upper edge of the rear wall of the scoop 16 to normally hold it against dumping. At their lower ends the latching members 23 and 24 are formed with eyes 26 to which retractile coil springs 27 are attached, the rear ends of said springs being attached to the forward end portions of the respective stabilizing arms 21. It is the function of the springs 27 to move the latching members to such position that the hooks 25 may engage the rear wall of the scoop and to hold them in such engaging position as illustrated in solid lines in Fig. 6. The latching members 23 and 24 are freely pivoted on the rod 22 in order that they may respond quickly to the action of the springs 27 and to the action of the releasing means about to be described.

A sleeve 28 is pivotally mounted on the rod 22 between the latching members 23 and 24. A releasing lever 29 is formed with a hub 30 which engages and is fixed to the sleeve 28 and said lever extends upwardly and has its upper end pivotally connected to a link 31 which extends rearwardly of the tractor and is pivotally connected to a lever 32 adjacent the driver's seat of the tractor and adapted for manual operation in dumping the scoop. On the hub 30 of the releasing lever 29 is formed a substantially L-shaped releasing member 33 which extends downwardly and then laterally to a position behind the lower end of the latching member 23 and a similar releasing member 34 is carried by a collar 35 which is fixed to the sleeve 28 adjacent the latching member 24. The L-shaped releasing member 34 extends into a position behind the lower end of the latching member 24 and when the lever 32 is operated it serves to oscillate the releasing lever 29 and cause the releasing members 33 and 34 to exert a forward pressure on the lower ends of the latching members 23 and 24 against the action of the springs 27, thus moving the hooks 25 out of holding engagement with the scoop 16 and permitting said scoop to move through an arc to dumping position as indicated in Fig. 2. This movement of the scoop is limited by means of chains 36 fixed to the rear wall of the scoop and to the forward ends of the lifting arms 13.

I have also provided means for automatically returning the scoop 16 to its normal position on the scoop rests 14 as it is lowered by downward movement of the lifting arms 13 to carry the parts to loading position. Levers 37 and 38 are pivoted at their lower ends on the forward end portions of the respective lifting arms 13 a short distance rearwardly of the pivots 15 of the scoop rests. Links 39 and 40 are pivotally attached at their rear ends to the upper ends of the levers 37 and 38 and said links extend forwardly and have their opposite ends pivotally connected to the outer faces of the side walls of the scoop 16 at the points 41. The pivots 41 are located a short distance above the pivots 18 of the scoop to the scoop rests and when the scoop is dumped, said pivots 41 move forwardly of the vertical plane of the pivots 18 as is clearly shown in Fig. 2. Heavy coil spring 42 and 43 are fixed to intermediate points of the levers 37 and 38 and the rear ends of said springs are fixed to clevises 44 and 45 or U-shaped links which are pivotally attached to the stabilizing arms 21 at the points 46. The links 39 and 40 are shown as offset outwardly between their ends in order that their forward end portions may embrace the scoop 16 which preferably is considerably wider than the space between the scoop rests 14.

The arrangement of the lifting arm 13 and stabilizing arm 21 at each side of the machine is such that a substantial parallelogram is defined by the points at which said arms are pivoted to the frame and to the scoop rest, although as here shown, the points of pivoting to the scoop rest are slightly farther apart than the points pivoting to the frame 10. The points of connection of the returning springs 42 and 43 to the arms 13 and 21 are arranged obliquely of these parallelograms and it is obvious that as the mechanism is raised to the position shown in Fig. 1, these points of attachment will approach each other so that the springs 42 and 43 and their connections are slackened. When the scoop 16 is permitted to dump, however, the levers 37 and 38 are moved forwardly as shown in Fig. 2, a distance sufficient to take up such slack and also to cause some tension on the springs 42 and 43. As the mechanism is thereafter lowered toward the position shown in Fig. 3, the arrangement of the parts causes the points of connection of the springs 42 and 43 to the arms 13 and 21 to move away from each other and thus place the said springs under considerable additional tension. The result of this is to apply sufficient force to the scoop 16 through the links 39 and 40 to cause said scoop to be returned to its normal position on the scoop rests 14 and to be engaged by the hooks 25 to hold it in such position. This provides a simple and efficient means for automatically returning the scoop to position for loading.

I claim as my invention:

1. In a loading machine, a pair of pivoted scoop rests, a scoop pivoted on said rests, means for raising and lowering said scoop rests, a rod extending transversely between the upper ends of said scoop rests, a pair of latching members pivoted on said rod, each of said latching members being formed with a hook adapted to engage the scoop and normally hold it from dumping, springs acting to urge said latching members to latching position, a sleeve pivotally mounted on said rod between said latching members, a pair of releasing members fixed to said sleeve and each having a portion extending into engagement with one of said latching members for oscillating the same into inoperative position, and means for turning said sleeve on said rod.

2. In a loading machine, a pair of pivoted scoop rests, a scoop pivoted on said rests, means for raising and lowering said scoop rests, a rod extending transversely between the upper ends of said scoop rests, a pair of latching members pivoted on said rod, each of said latching members being formed with a hook adapted to engage the scoop and normally hold it from dumping, springs acting to urge said latching members to latching position, a sleeve pivotally mounted on said rod between said latching members, a pair of releasing members fixed to said sleeve and each having a portion extending into engagement with one of said latching members for oscillating the same into inoperative position, and a lever fixed to said sleeve for turning it and causing said releasing member to engage and release said latching members.

3. In a loading machine, a pair of pivoted substantially L-shaped scoop rests, a scoop pivoted on said rests, means for raising and lowering said scoop rests, a rod extending transversely between the upper ends of said scoop rests, a pair of latching members pivoted between their ends on said rod, each of said latching members being formed at its upper end with a hook adapted to engage the scoop and normally hold it from dumping, springs connected with the lower ends of said latching members and acting to urge them toward latching position, a sleeve pivotally mounted on said rod between said latching members, a pair of releasing members fixed to said sleeve and each having a portion extending downwardly and laterally into a position behind the lower end of one of said latching members, a releasing lever rigidly connected with said sleeve for turning it on said rod and causing said releasing members to engage and release said latching members, and an operating link pivoted to said lever.

4. In a loading machine, a lifting arm arranged for swinging movement in a vertical plane, a substantially L-shaped scoop rest pivoted at its lower end to the forward end of said lifting arm, a scoop pivoted on said scoop rest, a stabilizing arm arranged substantially parallel with said lifting arm and having its forward end pivoted to the upper end of said scoop rest, a lever pivoted on said lifting arm rearwardly of the pivot of said scoop rest, a returning link pivotally connecting said lever to said scoop and a tension means connected with said lever and extending upwardly and rearwardly and attached to said stabilizing arm, whereby power is stored in said tension member when the scoop moves forwardly to dumping position, and whereby as the lifting arm is lowered further strain is placed on said tension member to cause said scoop to be returned to normal position on said scoop rest.

H. F. LESSMANN.